US012563419B2

(12) United States Patent
Li

(10) Patent No.: US 12,563,419 B2
(45) Date of Patent: Feb. 24, 2026

(54) METHOD AND APPARATUS FOR PROCESSING FAST RETURN MEASUREMENT TASK, STORAGE MEDIUM, AND ELECTRONIC DEVICE

(71) Applicant: ZTE Corporation, Shenzhen (CN)

(72) Inventor: Tengfei Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 307 days.

(21) Appl. No.: 18/567,924

(22) PCT Filed: May 26, 2022

(86) PCT No.: PCT/CN2022/095328
§ 371 (c)(1),
(2) Date: Dec. 7, 2023

(87) PCT Pub. No.: WO2022/267811
PCT Pub. Date: Dec. 29, 2022

(65) Prior Publication Data
US 2024/0276244 A1 Aug. 15, 2024

(30) Foreign Application Priority Data
Jun. 23, 2021 (CN) .......................... 202110701081.8

(51) Int. Cl.
*H04W 4/00* (2018.01)
*H04W 24/02* (2009.01)
(Continued)

(52) U.S. Cl.
CPC ........... *H04W 24/02* (2013.01); *H04W 76/27* (2018.02); *H04W 36/142* (2023.05)

(58) Field of Classification Search
CPC ... H04W 24/02; H04W 76/27; H04W 36/142; H04W 24/10; H04W 36/0022; H04W 76/30; H04W 76/34
See application file for complete search history.

(56) References Cited

U.S. PATENT DOCUMENTS 10,412,638 B2 * 9/2019 Yang ...................... H04W 76/34
11,229,083 B1 * 1/2022 Panchal ................ H04W 24/10
(Continued)

FOREIGN PATENT DOCUMENTS

CN 110463250 A 11/2019
CN 112205029 A 1/2021
CN 112672391 A 4/2021

OTHER PUBLICATIONS

International Search Report for corresponding application PCT/CN2022/095328 filed May 26, 2022; Mail date Aug. 19, 2022.
(Continued)

*Primary Examiner* — Omoniyi Obayanju
(74) *Attorney, Agent, or Firm* — CANTOR COLBURN LLP

(57) ABSTRACT

A method and apparatus for processing a fast return measurement task, a storage medium, and an electronic device are provided. The method includes: determining a data service state of a terminal during a voice call; in response to determining that, when the voice call ends, the data service state is that there is no data service, performing Radio Resource Control (RRC) release on the terminal through an RRC release command; and in response to determining that the data service state is that there is data service, stopping executing other measurement tasks configured previously, and executing only the fast return measurement task on the terminal.

20 Claims, 4 Drawing Sheets

(51) Int. Cl.
_H04W 76/27_ (2018.01)
_H04W 36/14_ (2009.01)

(56) References Cited

U.S. PATENT DOCUMENTS

2020/0068425 A1    2/2020  Xue et al.
2021/0051529 A1    2/2021  Yuan et al.

OTHER PUBLICATIONS

European Search Report for corresponding application EP22827308;
Report dated Aug. 22, 2024.
OPPO, Discussion on Issue about Returning from UTRAN to
NG-RAN, 3GPP TGS-RAN2 Meeting #102, Busan Korea, May
21-25, 2018, R2-1807241.
Xiao Li, Research on 5G SA Network Shared Voice Solution, 2021
2nd Information Communication Technology Conference, pp. 65-69.
XP033920844.

* cited by examiner

METHOD AND APPARATUS FOR PROCESSING FAST RETURN MEASUREMENT TASK, STORAGE MEDIUM, AND ELECTRONIC DEVICE

CROSS-REFERENCE TO RELATED APPLICATION

The present disclosure is a National Stage Filing of the PCT International Application No. PCT/CN2022/095328 filed on May 26, 2022, which is based upon and claims priority to Chinese Patent Application CN 202110701081.8 filed on Jun. 23, 2021, entitled "METHOD AND APPARA-TUS FOR PROCESSING FAST RETURN MEASURE-MENT TASK, STORAGE MEDIUM, AND ELECTRONIC DEVICE", the disclosure of which is incorporated herein by reference in their entireties.

TECHNICAL FIELD

Embodiments of the present disclosure relate to the field of communications, and in particular, to a method and apparatus for processing a fast return measurement task, a storage medium, and an electronic device.

BACKGROUND

When conducting a call in a target system, a voice fallback user may simultaneously execute other measure-ment tasks. There is an upper limit on the number of measurement objects supported by a terminal, and when the voice service ends, a fast return measurement task config-ured by a network side for the terminal may be relatively late, which causes the following problems.

The fast return measurement task may exceed the upper limit of the number of measurement objects supported by the terminal. In this case, the terminal does not execute the fast return measurement task, and therefore cannot trigger mea-surement reporting to execute the operation of returning to the original system, thereby affecting a success rate index of fast return.

Even if the fast return measurement task does not exceed the upper limit of the number of measurement objects supported by the terminal, a delay index of fast return may be influenced due to the existence of other measurement tasks.

Aiming at the problems in the related art that the success rate of fast return of the terminal is low and the time delay of fast return of the terminal is large due to the existence of other measurement tasks, no solution has been proposed.

SUMMARY

The embodiments of the present disclosure provide a method and apparatus for processing a fast return measure-ment task, a storage medium, and an electronic device, which may at least solve the problems in the related art that the success rate of fast return of a terminal is low and the time delay of fast return of the terminal is large due to the existence of other measurement tasks.

According to the embodiments of the present disclosure, a method for processing a fast return measurement task is provided, including:

determining a data service state of a terminal during a voice call;

in response to determining that, when the voice call ends, the data service state is that there is no data service, performing Radio Resource Control (RRC) release on the terminal through an RRC release command; and in response to determining that the data service state is that there is data service, stopping executing other measurement tasks configured previously, and execut-ing only the fast return measurement task on the terminal.

In an exemplary embodiment, performing the RRC release on the terminal through the RRC release command includes:

sending the RRC release command to the terminal, wherein the RRC release command carries a priority order of target frequency points designated for fast return, and the RRC release command is used for instructing the terminal to return to a Fifth Generation communication (5G) system through idle state reselec-tion according to the priority order of the target fre-quency points.

In an exemplary embodiment, stopping executing the other measurement tasks configured previously, and execut-ing only the fast return measurement task on the terminal includes:

deleting the other measurement tasks from a fast return measurement reconfiguration message, and caching the other measurement tasks; and at the same time, configuring the fast return measurement task for the terminal according to the priority order of the target frequency points.

In an exemplary embodiment, performing the fast return measurement task on the terminal includes:

configuring execution duration for the fast return mea-surement task;

within the execution duration, controlling the terminal to keep executing a measurement task, receiving a mea-surement report reported by the terminal, and control-ling, according to the measurement report, the terminal to fast return to the 5G system through switching or redirection; and in a case where the execution duration is exceeded and the terminal does not return to the 5G system, deleting the fast return measurement task, and resuming the other measurement tasks.

In an exemplary embodiment, the method further includes:

detecting and evaluating a channel condition, interference and other data service perception conditions of the data service, so as to obtain a detection and evaluation result;

judging whether the detection evaluation result satisfies a preset condition;

when the voice call ends or in a process of executing the fast return measurement task, triggering to perform blind redirection processing on the terminal of which the detection evaluation result satisfies the preset con-dition, so that the terminal returns to a Fifth Generation communication (5G) system through blind redirection and idle state reselection.

In an exemplary embodiment, triggering to perform the blind redirection processing on the terminal of which the detection evaluation result satisfies the preset condition includes:

determining a target frequency point with the highest priority to be a redirection target frequency point according to a priority order of target frequency points designated for fast return; and sending a blind redirection command to the terminal, wherein the blind redirection command carries the redirection target frequency point and the priority order of the target frequency points, and the blind redirection command is used for instructing the terminal to return to the 5G system through blind redirection according to the redirection target frequency point, and in a case where the terminal fails in returning to the 5G system through blind redirection, return to the 5G system through idle state reselection according to the priority order of the target frequency points.

In an exemplary embodiment, judging whether the detection evaluation result satisfies the preset condition includes:

judging whether a channel condition of the terminal in a serving cell satisfies a first preset threshold value, so as to obtain a first judgment result;

judging whether interference on the terminal in the serving cell satisfies a second preset threshold value, so as to obtain a second judgment result;

judging whether other data service perception conditions of the terminal in the serving cell satisfy a third preset threshold value, so as to obtain a third judgment result;

in a case where at least one of the first judgment result, the second judgment result, and the third judgment result is positive, determining that the detection evaluation result meets the preset condition; and in a case where the first judgment result, the second judgment result and the third judgment result are all negative, determining that the detection evaluation result does not meet the preset condition.

According to another embodiment of the present disclosure, an apparatus for processing a fast return measurement task is also provided, including:

a determination module, configured to determine a data service state of a terminal during a voice call;

a releasing module, configured to, in response to determining that, when the voice call ends, the data service state is that there is no data service, perform Radio Resource Control (RRC) release on the terminal through an RRC release command; and an execution module, configured to, in response to determining that the data service state is that there is data service, stop executing other measurement tasks configured previously, and execute only the fast return measurement task on the terminal.

In an exemplary embodiment, the releasing module is further configured to:

send the RRC release command to the terminal, wherein the RRC release command carries a priority order of target frequency points designated for fast return, and the RRC release command is used for instructing the terminal to return to a Fifth Generation communication (5G) system through idle state reselection according to the priority order of the target frequency points.

In an exemplary embodiment, the execution module includes:

a deleting sub-module, configured to delete the other measurement tasks from a fast return measurement reconfiguration message, and caching the other measurement tasks; and a first configuration sub-module, configured to configure the fast return measurement task for the terminal according to the priority order of the target frequency points at the same time.

In an exemplary embodiment, the execution module includes:

a second configuration sub-module, configured to configure execution duration for the fast return measurement task;

a control sub-module, configured to, within the execution duration, control the terminal to keep executing a measurement task, receive a measurement report reported by the terminal, and control, according to the measurement report, the terminal to fast return to the 5G system through switching or redirection; and a recovery sub-module, configured to, in a case where the execution duration is exceeded and the terminal does not return to the 5G system, delete the fast return measurement task, and resuming the other measurement tasks.

In an exemplary embodiment, the apparatus further includes:

a detection and evaluation module, configured to detect and evaluate a channel condition, interference and other data service perception conditions of the data service, so as to obtain a detection and evaluation result;

a judgment module, configured to judge whether the detection evaluation result satisfies a preset condition; and a blind redirection module, configured to, when the voice call ends or in a process of executing the fast return measurement task, trigger to perform blind redirection processing on the terminal of which the detection evaluation result satisfies the preset condition, so that the terminal returns to a Fifth Generation communication (5G) system through blind redirection and idle state reselection.

In an exemplary embodiment, the blind redirection module may include:

a determination sub-module, configured to determine a target frequency point with the highest priority to be a redirection target frequency point according to a priority order of target frequency points designated for fast return; and a sending sub-module, configured to send a blind redirection command to the terminal, wherein the blind redirection command carries the redirection target frequency point and the priority order of the target frequency points, and the blind redirection command is used for instructing the terminal to return to the 5G system through blind redirection according to the redirection target frequency point, and in a case where the terminal fails in returning to the 5G system through blind redirection, return to the 5G system through idle state reselection according to the priority order of the target frequency points.

In an exemplary embodiment, the judgment module is further configured to:

judge whether a channel condition of the terminal in a serving cell satisfies a first preset threshold value, so as to obtain a first judgment result;

judge whether interference on the terminal in the serving cell satisfies a second preset threshold value, so as to obtain a second judgment result;

judge whether other data service perception conditions of the terminal in the serving cell satisfy a third preset threshold value, so as to obtain a third judgment result;

in a case where at least one of the first judgment result, the second judgment result, and the third judgment result is positive, determine that the detection evaluation result meets the preset condition; and in a case where the first judgment result, the second judgment result and the third judgment result are all negative, determine that the detection evaluation result does not meet the preset condition.

According to another embodiment of the present disclosure, a computer-readable storage medium is further provided. The computer-readable storage medium stores a computer program, wherein the computer program, when running on a processor, causes the processor to execute the operations in any one of the method embodiments.

According to another embodiment of the present disclosure, also provided is an electronic device, including a memory and a processor, wherein the memory stores a computer program, and the processor is configured to run the computer program so as to execute the operations in any one of the method embodiments.

According to the embodiments of the present disclosure, a data service state of a terminal during a voice call is determined; in response to determining that, when the voice call ends, the data service state is that there is no data service, RRC release is performed on the terminal through an RRC release command; and in response to determining that the data service state is that there is data service, the execution of other measurement tasks configured previously is stopped, and only the fast return measurement task is executed on the terminal. The problems in the related art that the success rate of fast return of a terminal is low and the time delay of fast return of the terminal is large due to the existence of other measurement tasks can be solved, such that indexes such as the time delay of fast return and the success rate of fast return may be effectively improved.

DETAILED DESCRIPTION

Embodiments of the present disclosure will be described below in detail with reference to the accompanying drawings and in conjunction with embodiments.

It should be noted that, terms such as "first" and "second" in the description, claims, and accompanying drawings of the present disclosure are used to distinguish similar objects, but are not necessarily used to describe a specific sequence or order.

Figure 1:
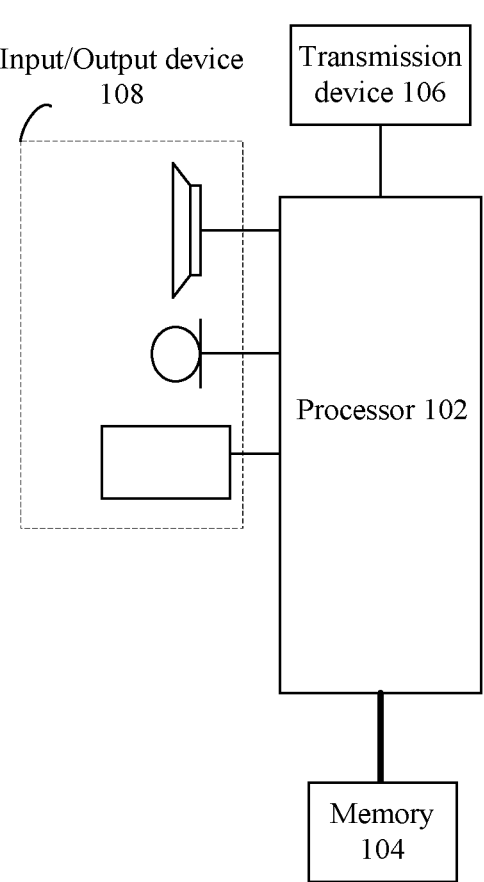
FIG. 1 is a block diagram of the hardware structure of a mobile terminal for implementing a method for processing a fast return measurement task according to the embodiments of the present disclosure.

The method embodiments provided in the embodiments of the present disclosure may be executed in a mobile terminal, a computer terminal or a similar computing device. Taking the implementation on a mobile terminal as an example, FIG. 1 is a block diagram of the hardware structure of a mobile terminal for implementing a method for processing a fast return measurement task according to the embodiments of the present disclosure. As shown in FIG. 1, a mobile terminal may include one or more (only one is shown in FIG. 1) processors 102 (the processors 102 may include, but are not limited to, processing components such as a Micro Controller Unit (MCU) or a programmable logic device (e.g., a Field Programmable Gate Array, FPGA)) and a memory 104 for storing data. The mobile terminal may further include a transmission device 106 for a communication function and an input/output device 108. A person having ordinary skill in the art may understand that the structure shown in FIG. 1 is merely exemplary, which does not limit the structure of the foregoing mobile terminal. For example, the mobile terminal may further include more or fewer components than shown in FIG. 1, or have a different configuration from that shown in FIG. 1.

The memory 104 may be used for storing a computer program, for example, a software program and modules of application software, such as a computer program corresponding to the method for processing the fast return measurement task in the embodiments of the present disclosure. The processor 102 runs the computer program stored in the memory 104, so as to execute various function applications and service chain address pool slice processing, thereby realizing the described method. The memory 104 may include high-speed random access memory, and may also include non-volatile memory, such as one or more magnetic storage devices, flash memory, or other non-volatile solid-state memory. In some instances, the memory 104 may further include a memory remotely located with respect to the processor 102, and the memory remotely located may be connected to the mobile terminal over a network. Examples of such network include, but are not limited to, the Internet, an intranet, a local area network, a mobile communication network, and combinations thereof.

The transmission device 106 is configured to receive or transmit data via a network. Specific examples of the described network may include a wireless network provided by a communication provider of the mobile terminal. In an example, the transmission device 106 may include a Network Interface Controller (NIC) that may be coupled to other network devices via a base station to communicate with the Internet. In an example, the transmission device 106 may be a Radio Frequency (RF) module for communicating wirelessly with the Internet.

Figure 2:
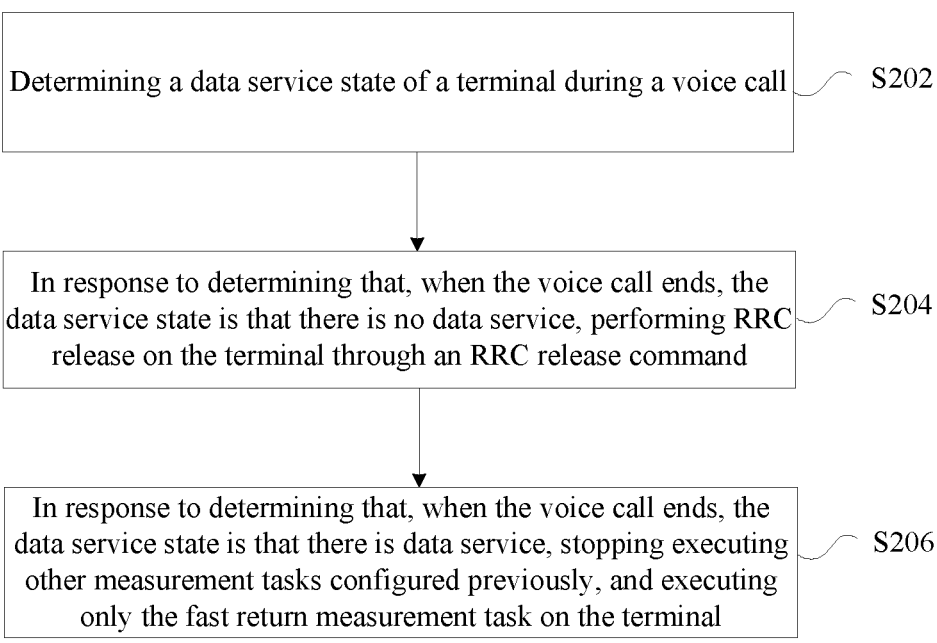
FIG. 2 is a flowchart of a method for processing a fast return measurement task according to the embodiments of the present disclosure.

A method for processing a fast return measurement task running on the described mobile terminal or network architecture is provided in the embodiments of the present disclosure. FIG. 2 is a flowchart of a method for processing a fast return measurement task according to the embodiments of the present disclosure. As shown in FIG. 2, the flow includes the following operations S202 to S206.

At S202, a data service state of a terminal during a voice call is determined.

Considering that different bearers may adopt different transmission intervals for data packets, the data service state may be detected by respectively configuring different inactive timers for different bearers. For a determined bearer of the data service, when no data packet is transmitted beyond a specified duration, it is considered that the bearer has no data service. For all the data service bearers established for a user, it is considered that the user has no data service when none of the data service bearers has a data service.

At S204, in response to determining that, when the voice call ends, the data service state is that there is no data service, RRC release is performed on the terminal through an RRC release command.

For a user having no data service, a 4G base station directly performs RRC release, and an RRC release command carries dedicated reselection priority information according to a priority order of target frequency points designated for fast return. The higher the priority of the target frequency point is, the higher the corresponding carried dedicated reselection priority is, enabling the user to return to the 5G system through idle state reselection according to the priority order of the target frequency points designated for fast return, thereby preventing other measurement tasks in a connection state from affecting the success rate and the time delay of fast return.

At S206, in response to determining that the data service state is that there is data service, execution of other measurement tasks configured previously is stopped, and only the fast return measurement task is executed on the terminal.

In the embodiments of the present disclosure, the operation S206 may include: the other measurement tasks are deleted from a fast return measurement reconfiguration message, and are cached; and at the same time, the fast return measurement task is configured for the terminal according to the priority order of the target frequency points.

For a user having a data service, a 4G base station may delete, in a fast return measurement reconfiguration message, other measurement tasks and related measurement objects (including measurement objects corresponding to fast return target frequency points) configured previously and cache the deleted other measurement tasks and related measurement objects, and at the same time, configure a new measurement task for the terminal according to the priority order of target frequency points designated for the fast return. In this way, the normal operation of the data service is ensured, while preventing other measurement tasks in the connection state from affecting the success rate and the time delay of fast return.

By the operations S202 to S206, a data service state of a terminal during a voice call is determined; in response to determining that, when the voice call ends, the data service state is that there is no data service, RRC release is performed on the terminal through an RRC release command; and in response to determining that the data service state is that there is data service, the execution of other measurement tasks configured previously is stopped, and only the fast return measurement task is executed on the terminal. The problems in the related art that the success rate of fast return of a terminal is low and the time delay of fast return of the terminal is large due to the existence of other measurement tasks can be solved, such that indexes such as the time delay of fast return and the success rate of fast return may be effectively improved.

In the embodiments of the present disclosure, the operation S204 may include an operation of sending the RRC release command to the terminal, wherein the RRC release command carries a priority order of target frequency points designated for fast return, and the RRC release command is used for instructing the terminal to return to a Fifth Generation communication (5G) system through idle state reselection according to the priority order of the target frequency points.

In an exemplary embodiment, for a user having a data service, in order to prevent a user's off-line problem caused by stopping other measurement tasks, a 4G base station needs to configure execution duration for a fast return measurement task; within the execution duration, the terminal is controlled to keep executing a measurement task, a measurement report reported by the terminal is received, and the terminal is controlled, according to the measurement report, to fast return to the 5G system through switching or redirection; and in a case where the execution duration is exceeded and the terminal does not return to the 5G system, the fast return measurement task is deleted, and the other measurement tasks are resumed. The execution duration may be manually and statically configured, or automatically calculated according to the number of target frequency points designated for fast return. During the execution duration, the terminal is controlled to keep performing the fast return measurement task normally, and a fast return switching or a redirection operation is normally triggered for a received fast return measurement report reported by the terminal. If the terminal does not return to the 5G system before the expiration of the execution duration, it is considered that the 5G coverage condition is not satisfied, and the 4G base station needs to delete the fast return measurement task and recover the previously cached measurement tasks.

In an exemplary embodiment, for a user having a data service, in addition to controlling the execution duration of fast return measurement to prevent a user's off-line problem caused by stopping other measurement tasks, channel condition, interference and other data service perception conditions may be further evaluated for the data service. When the voice call ends or in a process of executing the fast return measurement task, blind redirection operation may be directed triggered for a user whose detection evaluation result is poor. In some exemplary implementations, a channel condition, interference and other data service perception conditions of the data service are detected and evaluated to obtain a detection and evaluation result; whether the detection evaluation result satisfies a preset condition is judged; when the voice call ends or in a process of executing the fast return measurement task, a blind redirection processing is triggered for the terminal whose detection evaluation result meets the preset condition, so that the terminal returns to a 5G system through blind redirection and idle state reselection. In some exemplary implementations, a target frequency point with the highest priority is determined to be a redirection target frequency point according to a priority order of target frequency points designated for fast return; and a blind redirection command is sent to the terminal, wherein the blind redirection command carries the redirection target frequency point and the priority order of the target frequency points, and the blind redirection command is used for instructing the terminal to return to the 5G system through blind redirection according to the redirection target frequency point, and in a case where the terminal fails in returning to the 5G system through blind redirection, return to the 5G system through idle state reselection according to the priority order of the target frequency points.

The redirection target frequency point may carry a frequency point with a highest priority and designated for fast return, and at the same time, may carry dedicated reselection priority information according to the priority order of the target frequency points designated for fast return. The higher the priority of the target frequency point is, the higher the carried dedicated reselection priority is, and the user is controlled to return to the 5G system through blind redirection and idle state reselection according to the priority order of the target frequency points designated for fast return, thereby preventing the user from continuing to reside in the present cell and causing the off-line problem of the user. Further, the operation of judging whether the detection evaluation result satisfies the preset condition includes: judging whether a channel condition of the terminal in a serving cell satisfies a first preset threshold value, so as to obtain a first judgment result; judging whether interference on the terminal in the serving cell satisfies a second preset threshold value, so as to obtain a second judgment result; judging whether other data service perception conditions of the terminal in the serving cell satisfy a third preset threshold value, so as to obtain a third judgment result; in a case where at least one of the first judgment result, the second judgment result, and the third judgment result is positive, determining that the detection evaluation result meets the preset condition; and in a case where the first judgment result, the second judgment result and the third judgment result are all negative, determining that the detection evaluation result does not meet the preset condition.

The channel condition, interference and other data service perception conditions may be detected and evaluated based on, but are not limited to, the following judgment conditions (any judgment condition): a measurement result (including Reference Signal Received Power (RSRP), Reference Signal Received Quality (RSRQ), Signal to Interference & Noise Ratio (SINR), etc.) for a serving cell reported by the user satisfies a specified threshold (corresponding to the described first preset threshold); the interference (including but not limited to uplink SINR, Noise and Interference (NI), Modulation and Coding Scheme (MCS), Channel Quality Information (CQI), Block Error Rate (BLER), etc.) to a user in a serving cell satisfies a specified threshold (corresponding to the described second preset threshold); other data service perception conditions (including but not limited to spectrum efficiency, packet loss rate, time delay, etc.) of the user in the serving cell satisfy a specified threshold (a third preset threshold value).

In the embodiments of the present disclosure, a 4G base station evaluates, with respect to an EPS Fallback user, whether there is a data service to be performed during a voice call, and with respect to a user without a data service, performs RRC release when the voice service ends, so that the user returns to a 5G system through idle state reselection; with regard to a user having a data service, only a fast return measurement task is executed by stopping other measurement tasks, and a timer is started to control the maximum execution duration of the fast return measurement task. The technical solution may solving the problems that the success rate of fast return of a terminal is low and the time delay of fast return of the terminal is large due to the existence of other measurement tasks. By means of the method, indexes such as the time delay of fast return and the success rate of fast return can be effectively improved.

Figure 3:
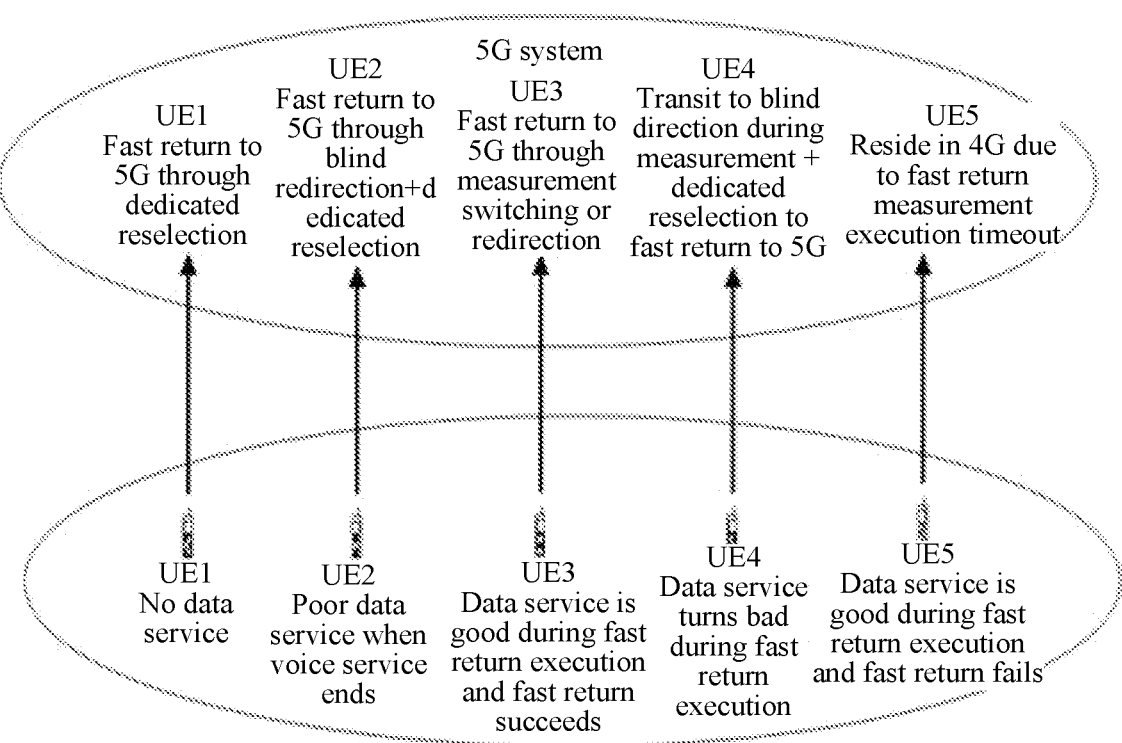
FIG. 3 is a schematic diagram of a method for ensuring fast return to 5G after an EPS Fallback service ends according to the embodiments of the present disclosure.

FIG. 3 is a schematic diagram of a method for ensuring fast return to 5G after an EPS Fallback service ends according to the embodiments of the present disclosure. As shown in FIG. 3, assuming that the configuration of the priority of the target frequency points for fast return is F1>F2>F3, the method includes the following operations 1 to 3.

At operation 1, whether there is a data service during a voice call is evaluated, and a data service state is detected by respectively configuring inactive timers for different bearers. Assuming that there are five EPS Fallback users, when a voice service of a 4G system ends, UE1 does not have a data service, UE2 has a data service and the data service is poor (for example, an uplink SINR is lower than a specified threshold), and UE3, UE4 and UE5 have a data service and the data service is good.

At operation 2, according to the data service state of the user when the voice service ends, the 4G base station respectively performs the following operations for the five users.

For UE1, RRC release is performed, where the RRC release command carries a dedicated reselection priority F1>F2>F3.

For UE2, the F1 frequency point is selected to perform blind redirection, where a redirection command carries a dedicated reselection priority F1>F2>F3.

For UE3, UE4 and UE5, other measurement tasks and related measurement objects (including the measurement objects corresponding to the target frequency points designated for fast return) configured previously are deleted, and a new fast return measurement task is configured for the terminal according to the order of F1, F2 and F3, i.e., F1>F2>F3.

At operation 3, with regard to UE3, UE4 and UE5, the 4G base station configures execution duration of 1.5 s for the fast return measurement task, and performs a corresponding operation according to the behavior of each user.

Assuming that the data service of UE3 is always good within the execution duration and the fast return is successful for UE3, there is no need to perform other additional operations in the 4G system.

Assuming that the data service of UE4 becomes poor (for example, an uplink SINR is lower than a specified threshold) within the execution duration, an F1 frequency point is selected to perform blind redirection on UE4, and a redirection command carries a dedicated reselection priority F1>F2>F3.

Assuming that the data service of UE5 is always good within the execution duration but UE5 fails in fast returning to the 5G system, and UE5 still resides in the 4G system after the execution duration expires, it is considered that the 5G coverage condition is not satisfied, and the 4G base station deletes the fast return measurement task and restores the previously cached measurement tasks.

With regard to the EPS Fallback users, the 4G base station evaluates whether there is ongoing data service during a voice call, and with regard to a user without a data service, RRC release is performed when the voice service ends, so that the user returns to a 5G system through an idle state reselection; with regard to a user having a data service, only a fast return measurement task is executed by stopping other measurement tasks, and a timer is started to control the maximum execution duration of the fast return measurement task. By means of the method, indexes such as the time delay of fast return and the success rate of fast return can be effectively improved.

Figure 4:
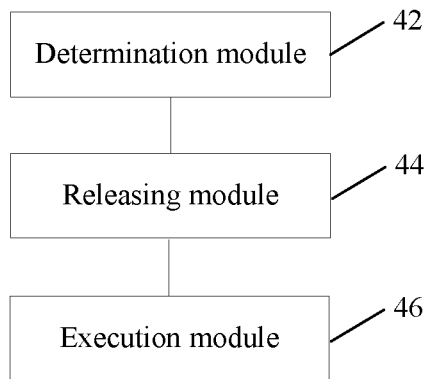
FIG. 4 is a block diagram of an apparatus for processing a fast return measurement task according to the embodiments of the present disclosure.

According to another embodiment of the present disclosure, an apparatus for processing a fast return measurement task is also provided. FIG. 4 is a block diagram of an apparatus for processing a fast return measurement task according to the embodiments of the present disclosure. As shown in FIG. 4, the apparatus includes:

a determination module 42, configured to determine a data service state of a terminal during a voice call;

a releasing module 44, configured to, in response to determining that, when the voice call ends, the data service state is that there is no data service, perform Radio Resource Control (RRC) release on the terminal through an RRC release command; and an execution module 46, configured to, in response to determining that the data service state is that there is data service, stop executing other measurement tasks configured previously, and execute only the fast return measurement task on the terminal.

In an exemplary embodiment, the releasing module 44 is further configured to:

send the RRC release command to the terminal, wherein the RRC release command carries a priority order of target frequency points designated for fast return, and the RRC release command is used for instructing the terminal to return to a Fifth Generation communication (5G) system through idle state reselection according to the priority order of the target frequency points.

In an exemplary embodiment, the execution module 46 includes:

a deleting sub-module, configured to delete the other measurement tasks from a fast return measurement reconfiguration message, and caching the other measurement tasks; and a first configuration sub-module, configured to configure the fast return measurement task for the terminal according to the priority order of the target frequency points at the same time.

In an exemplary embodiment, the execution module 46 includes:

a second configuration sub-module, configured to configure execution duration for the fast return measurement task;

a control sub-module, configured to, within the execution duration, control the terminal to keep executing a measurement task, receive a measurement report reported by the terminal, and control, according to the measurement report, the terminal to fast return to the 5G system through switching or redirection; and a recovery sub-module, configured to, in a case where the execution duration is exceeded and the terminal does not return to the 5G system, delete the fast return measurement task, and resuming the other measurement tasks.

Figure 5:
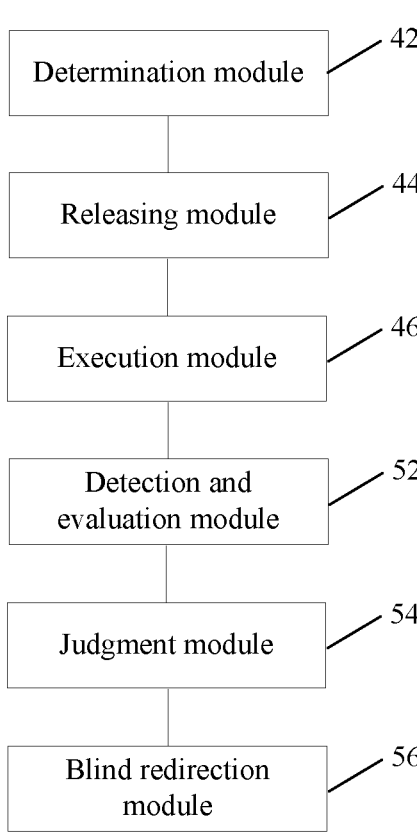
FIG. 5 is a block diagram of an apparatus for processing a fast return measurement task according to an exemplary embodiment of the present disclosure.

FIG. 5 is a block diagram of an apparatus for processing a fast return measurement task according to an exemplary embodiment of the present disclosure. As shown in FIG. 5, the apparatus further includes:

a detection and evaluation module 52, configured to detect and evaluate a channel condition, interference and other data service perception conditions of the data service, so as to obtain a detection and evaluation result;

a judgment module 54, configured to judge whether the detection evaluation result satisfies a preset condition; and a blind redirection module 56, configured to, when the voice call ends or in a process of executing the fast return measurement task, trigger to perform blind redirection processing on the terminal of which the detection evaluation result satisfies the preset condition, so that the terminal returns to a Fifth Generation communication (5G) system through blind redirection and idle state reselection.

In an exemplary embodiment, the blind redirection module 56 may include:

a determination sub-module, configured to determine a target frequency point with the highest priority to be a redirection target frequency point according to a priority order of target frequency points designated for fast return; and a sending sub-module, configured to send a blind redirection command to the terminal, wherein the blind redirection command carries the redirection target frequency point and the priority order of the target frequency points, and the blind redirection command is used for instructing the terminal to return to the 5G system through blind redirection according to the redirection target frequency point, and in a case where the terminal fails in returning to the 5G system through blind redirection, return to the 5G system through idle state reselection according to the priority order of the target frequency points.

In an exemplary embodiment, the judgment module is further configured to:

judge whether a channel condition of the terminal in a serving cell satisfies a first preset threshold value, so as to obtain a first judgment result;

judge whether interference on the terminal in the serving cell satisfies a second preset threshold value, so as to obtain a second judgment result;

judge whether other data service perception conditions of the terminal in the serving cell satisfy a third preset threshold value, so as to obtain a third judgment result;

in a case where at least one of the first judgment result, the second judgment result, and the third judgment result is positive, determine that the detection evaluation result meets the preset condition; and in a case where the first judgment result, the second judgment result and the third judgment result are all negative, determine that the detection evaluation result does not meet the preset condition.

The embodiments of the present disclosure also provide a computer-readable storage medium. The computer-readable storage medium stores a computer program, wherein the computer program, when running on a processor, causes the processor to execute the operations in any one of the described method embodiments.

In an exemplary embodiment, the computer-readable storage medium may include, but is not limited to, any medium that can store a computer program, such as a USB flash drive, a Read-Only Memory (ROM), a Random Access Memory (RAM), a removable hard disk, a magnetic disk, or an optical disc.

The embodiments of the present disclosure also provide an electronic device, including a memory and a processor. The memory stores a computer program. The processor is configured to run the computer program to execute operations in any method embodiment described above.

In an exemplary embodiment, the electronic device may further include a transmission device and an input/output device, wherein the transmission device is connected to the processor, and the input/output device is connected to the processor.

For specific examples in the embodiments of the present disclosure, reference may be made to the examples described in the foregoing embodiments and exemplary embodiments, and details are not repeatedly described herein in the embodiments of the present disclosure.

Obviously, those having ordinary skill in the art should understand that each module or each operation of the embodiments of the present disclosure can be implemented by a universal computing device, can be centralized on a single computing device or distributed on a network composed of a plurality of computing devices, and can be implemented by program codes executable for the computing devices, so that they can be stored in a storage device and executed by the computing devices. Furthermore, under some conditions, the shown or described operations can be executed in a sequence different from that described here, or they are made into integrated circuit modules respectively, or a plurality of modules or operations therein are made into a single integrated circuit module for implementation. As such, the embodiments of the present disclosure are not limited to any particular hardware and software combination.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection of the present disclosure.

What is claimed is:

1. A method for processing a fast return measurement task, comprising:

determining a data service state of a terminal during a voice call;

in response to determining that, when the voice call ends, the data service state is that there is no data service, performing Radio Resource Control (RRC) release on the terminal through an RRC release command; and in response to determining that the data service state is that there is data service, stopping executing other measurement tasks configured previously, and executing only the fast return measurement task on the terminal.

2. The method according to claim 1, wherein performing the RRC release on the terminal through the RRC release command comprises:

sending the RRC release command to the terminal, wherein the RRC release command carries a priority order of target frequency points designated for fast return, and the RRC release command is used for instructing the terminal to return to a Fifth Generation communication (5G) system through idle state reselection according to the priority order of the target frequency points.

3. The method according to claim 2, wherein stopping executing the other measurement tasks configured previously, and executing only the fast return measurement task on the terminal comprises:

deleting the other measurement tasks from a fast return measurement reconfiguration message, and caching the other measurement tasks; and at the same time, configuring the fast return measurement task for the terminal according to the priority order of the target frequency points.

4. The method according to claim 2, wherein performing the fast return measurement task on the terminal comprises:

configuring execution duration for the fast return measurement task;

within the execution duration, controlling the terminal to keep executing a measurement task, receiving a measurement report reported by the terminal, and controlling, according to the measurement report, the terminal to fast return to the 5G system through switching or redirection; and in a case where the execution duration is exceeded and the terminal does not return to the 5G system, deleting the fast return measurement task, and resuming the other measurement tasks.

5. The method according to claim 1, further comprising:

detecting and evaluating a channel condition, interference and other data service perception conditions of the data service, so as to obtain a detection and evaluation result;

judging whether the detection evaluation result satisfies a preset condition; and when the voice call ends or in a process of executing the fast return measurement task, triggering to perform blind redirection processing on the terminal of which the detection evaluation result satisfies the preset condition, so that the terminal returns to a Fifth Generation communication (5G) system through blind redirection and idle state reselection.

6. The method according to claim 5, wherein triggering to perform the blind redirection processing on the terminal of which the detection evaluation result satisfies the preset condition comprises:

determining a target frequency point with the highest priority to be a redirection target frequency point according to a priority order of target frequency points designated for fast return; and sending a blind redirection command to the terminal, wherein the blind redirection command carries the redirection target frequency point and the priority order of the target frequency points, and the blind redirection command is used for instructing the terminal to return to the 5G system through blind redirection according to the redirection target frequency point, and in a case where the terminal fails in returning to the 5G system through blind redirection, return to the 5G system through idle state reselection according to the priority order of the target frequency points.

7. The method according to claim 5, wherein judging whether the detection evaluation result satisfies the preset condition comprises:

judging whether a channel condition of the terminal in a serving cell satisfies a first preset threshold value, so as to obtain a first judgment result;

judging whether interference on the terminal in the serving cell satisfies a second preset threshold value, so as to obtain a second judgment result;

judging whether other data service perception conditions of the terminal in the serving cell satisfy a third preset threshold value, so as to obtain a third judgment result;

in a case where at least one of the first judgment result, the second judgment result, and the third judgment result is positive, determining that the detection evaluation result meets the preset condition; and in a case where the first judgment result, the second judgment result and the third judgment result are all negative, determining that the detection evaluation result does not meet the preset condition.

8. A non-transitory computer-readable storage medium, wherein the computer-readable storage medium stores a computer program, and the computer program, when running on a processor, causes the processor to execute following operations: determining a data service state of a terminal during a voice call: in response to determining that, when the voice call ends, the data service state is that there is no data service, performing Radio Resource Control (RRC) release on the terminal through an RRC release command; and in response to determining that the data service state is that there is data service, stopping executing other measurement tasks configured previously, and executing only a fast return measurement task on the terminal.

9. An electronic device, comprising a memory and a processor, wherein the memory stores a computer program, and the processor is configured to run the computer program so as to execute following operations: determining a data service state of a terminal during a voice call; in response to determining that, when the voice call ends, the data service state is that there is no data service, performing Radio Resource Control (RRC) release on the terminal through an RRC release command: and in response to determining that the data service state is that there is data service, stopping executing other measurement tasks configured previously, and executing only a fast return measurement task on the terminal.

10. The method according to claim 4, wherein configuring the execution duration for the fast return measurement task comprises:

statically configuring the execution duration for the fast return measurement task; or automatically calculating the execution duration for the fast return measurement task according to the number of target frequency points designated for fast return, and configuring the calculated execution duration for the fast return measurement task.

11. The electronic device according to claim 9, wherein performing the RRC release on the terminal through the RRC release command comprises:

sending the RRC release command to the terminal, wherein the RRC release command carries a priority order of target frequency points designated for fast return, and the RRC release command is used for instructing the terminal to return to a Fifth Generation communication (5G) system through idle state reselection according to the priority order of the target frequency points.

12. The electronic device according to claim 11, wherein stopping executing the other measurement tasks configured previously, and executing only the fast return measurement task on the terminal comprises:

deleting the other measurement tasks from a fast return measurement reconfiguration message, and caching the other measurement tasks; and at the same time, configuring the fast return measurement task for the terminal according to the priority order of the target frequency points.

13. The electronic device according to claim 11, wherein performing the fast return measurement task on the terminal comprises:

configuring execution duration for the fast return measurement task;

within the execution duration, controlling the terminal to keep executing a measurement task, receiving a measurement report reported by the terminal, and controlling, according to the measurement report, the terminal to fast return to the 5G system through switching or redirection; and in a case where the execution duration is exceeded and the terminal does not return to the 5G system, deleting the fast return measurement task, and resuming the other measurement tasks.

14. The electronic device according to claim 13, wherein configuring the execution duration for the fast return measurement task comprises:

statically configuring the execution duration for the fast return measurement task; or automatically calculating the execution duration for the fast return measurement task according to the number of target frequency points designated for fast return, and configuring the calculated execution duration for the fast return measurement task.

15. The electronic device according to claim 9, wherein the processor is configured to run the computer program so as to further execute following operations:

detecting and evaluating a channel condition, interference and other data service perception conditions of the data service, so as to obtain a detection and evaluation result;

judging whether the detection evaluation result satisfies a preset condition; and when the voice call ends or in a process of executing the fast return measurement task, triggering to perform blind redirection processing on the terminal of which the detection evaluation result satisfies the preset condition, so that the terminal returns to a Fifth Generation communication (5G) system through blind redirection and idle state reselection.

16. The electronic device according to claim 15, wherein triggering to perform the blind redirection processing on the terminal of which the detection evaluation result satisfies the preset condition comprises:

determining a target frequency point with the highest priority to be a redirection target frequency point according to a priority order of target frequency points designated for fast return; and sending a blind redirection command to the terminal, wherein the blind redirection command carries the redirection target frequency point and the priority order of the target frequency points, and the blind redirection command is used for instructing the terminal to return to the 5G system through blind redirection according to the redirection target frequency point, and in a case where the terminal fails in returning to the 5G system through blind redirection, return to the 5G system through idle state reselection according to the priority order of the target frequency points.

17. The electronic device according to claim 15, wherein judging whether the detection evaluation result satisfies the preset condition comprises:

judging whether a channel condition of the terminal in a serving cell satisfies a first preset threshold value, so as to obtain a first judgment result;

judging whether interference on the terminal in the serving cell satisfies a second preset threshold value, so as to obtain a second judgment result;

judging whether other data service perception conditions of the terminal in the serving cell satisfy a third preset threshold value, so as to obtain a third judgment result;

in a case where at least one of the first judgment result, the second judgment result, and the third judgment result is positive, determining that the detection evaluation result meets the preset condition; and in a case where the first judgment result, the second judgment result and the third judgment result are all negative, determining that the detection evaluation result does not meet the preset condition.

18. The non-transitory computer-readable storage medium according to claim 8, wherein performing the RRC release on the terminal through the RRC release command comprises:

sending the RRC release command to the terminal, wherein the RRC release command carries a priority order of target frequency points designated for fast return, and the RRC release command is used for instructing the terminal to return to a Fifth Generation communication (5G) system through idle state reselection according to the priority order of the target frequency points.

19. The non-transitory computer-readable storage medium according to claim 18, wherein stopping executing the other measurement tasks configured previously, and executing only the fast return measurement task on the terminal comprises:

deleting the other measurement tasks from a fast return measurement reconfiguration message, and caching the other measurement tasks; and at the same time, configuring the fast return measurement task for the terminal according to the priority order of the target frequency points.

20. The non-transitory computer-readable storage medium according to claim 18, wherein performing the fast return measurement task on the terminal comprises:

configuring execution duration for the fast return measurement task;

within the execution duration, controlling the terminal to keep executing a measurement task, receiving a measurement report reported by the terminal, and controlling, according to the measurement report, the terminal to fast return to the 5G system through switching or redirection; and in a case where the execution duration is exceeded and the terminal does not return to the 5G system, deleting the fast return measurement task, and resuming the other measurement tasks.

\* \* \* \* \*